(12) United States Patent
Oztekin et al.

(10) Patent No.: US 11,595,629 B2
(45) Date of Patent: Feb. 28, 2023

(54) METHOD FOR MODIFYING STEROSCOPIC PAIRS OF IMAGES AND APPARATUS

(71) Applicant: VESTEL ELEKTRONIK SANAYI VE TICARET A.S., Manisa (TR)

(72) Inventors: Guner Oztekin, Manisa (TR); Gokhan Evren Yilmaz, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 17/282,908

(22) PCT Filed: Oct. 5, 2018

(86) PCT No.: PCT/EP2018/077118
§ 371 (c)(1),
(2) Date: Apr. 5, 2021

(87) PCT Pub. No.: WO2020/069752
PCT Pub. Date: Apr. 9, 2020

(65) Prior Publication Data
US 2021/0392315 A1    Dec. 16, 2021

(51) Int. Cl.
*H04N 13/133* (2018.01)
*G06T 5/40* (2006.01)

(52) U.S. Cl.
CPC ............. *H04N 13/133* (2018.05); *G06T 5/40* (2013.01); *G06T 2207/10021* (2013.01); *G06T 2207/30201* (2013.01)

(58) Field of Classification Search
CPC ........ H04N 13/133; G06T 2207/10021; G06T 5/40; G06T 2207/30201
See application file for complete search history.

(56) References Cited

U.S. PATENT DOCUMENTS

| | | | |
|---|---|---|---|
| 7,184,047 B1 * | 2/2007 | Crampton | G06T 17/00 348/592 |
| 2009/0208108 A1 * | 8/2009 | Shimano | G06T 5/50 382/218 |

(Continued)

FOREIGN PATENT DOCUMENTS

| | | |
|---|---|---|
| JP | 2003-215533 A | 7/2003 |
| JP | 2009-053748 A | 3/2009 |

(Continued)

OTHER PUBLICATIONS

PCT Search Report and Written Opinion dated May 16, 2019, Application No. PCT/EP2018/077118, Applicant Vestel Elektronik Sanayi Ve Ticaret A.S., 12 Pages.

(Continued)

*Primary Examiner* — Phi Hoang
(74) *Attorney, Agent, or Firm* — Brooks Kushman P.C.

(57) ABSTRACT

The present disclosure provides a method for modifying pairs of images for improved three-dimensional displaying. The method comprises analyzing the images for detecting the angle of incidence of the illuminating light in the images, and modifying the luminance values of at least a section of at least one of the images of each pair based on the angle of incidence and anatomical details of a human face. Further, the present invention provides a respective apparatus.

8 Claims, 5 Drawing Sheets

(56) References Cited

U.S. PATENT DOCUMENTS

| | | | |
|---|---|---|---|
| 2011/0091113 A1* | 4/2011 | Ito | G06T 3/0093 |
| | | | 382/197 |
| 2012/0229650 A1 | 9/2012 | Matthews | |
| 2012/0243776 A1 | 9/2012 | Arafune | |
| 2013/0044225 A1 | 2/2013 | Jeon | |
| 2013/0266213 A1 | 10/2013 | Yamashita et al. | |
| 2014/0198104 A1* | 7/2014 | Tanaka | H04N 13/133 |
| | | | 345/426 |
| 2015/0245009 A1* | 8/2015 | Tozuka | G01J 3/524 |
| | | | 433/29 |
| 2015/0279113 A1 | 10/2015 | Knorr et al. | |
| 2019/0079234 A1* | 3/2019 | Takagi | G02B 5/3058 |

FOREIGN PATENT DOCUMENTS

| | | |
|---|---|---|
| JP | 2012-199736 A | 10/2012 |
| JP | 2014-022867 A | 2/2014 |
| JP | 2015-119277 A | 6/2015 |
| JP | 2015-185176 A | 10/2015 |
| KR | 10-2013-0019519 A | 2/2013 |
| WO | 2013/080439 A1 | 6/2013 |

OTHER PUBLICATIONS

Korean Office Action (with English Machine Translation) dated Jul. 28, 2022, Application No. 10-2021-7013595, Applicant Vestel Elektronik Sanay Ve Ticaret A.S., 10 Pages.

Japanese Office Action (with English Machine Translation) dated Oct. 4, 2022, Application No. 2021-515619, 6 Pages.

Japanese Notice of Allowance (with English Machine Translation) dated Oct. 25, 2022, Application No. 2021-515619, 7 Pages.

\* cited by examiner

METHOD FOR MODIFYING STEROSCOPIC PAIRS OF IMAGES AND APPARATUS

CROSS-REFERENCE TO RELATED APPLICATION

This application is the U.S. national phase of PCT Application No. PCT/EP2018/077118 filed on Oct. 5, 2018, the disclosure of which is incorporated in its entirety by reference herein.

TECHNICAL FIELD

The disclosure relates to a method for modifying pairs of images for improved three-dimensional displaying. Further, the present disclosure relates to a respective apparatus.

BACKGROUND

Although applicable to any type of three-dimensional display, embodiments of the present disclosure will mainly be described in conjunction with three-dimensional videos.

Today, videos like, e.g., movies in cinemas or computer games may be provided as three-dimensional videos to users for example with a respective 3D-headset or 3D-glasses. The visuals may therefore represent a three-dimensional image that may also be perceived by the human brain as a three-dimensional image. For example, with a 3D-headset the human brain may receive visual information that indicates that the body of the user is moving (as shown in the three-dimensional video). However, the user's brain will not receive the corresponding information from the body's other sensors, which will usually indicate the body being seated or standing still.

This discrepancy between the provided visuals and the information provided by the other sensors leads to many users suffering from symptoms such as headache, fatigue or the like. Such symptoms may be caused by non-naturalness of the contents, i.e., by discrepancies between what a user sees via the screen and what a user's brain expects.

Usually, the information the other sensors provide to the brain may not be influenced directly, especially if the user is, e.g., sitting on a chair. However, the visuals may be adapted to minimize the adversary symptoms that may be caused.

Accordingly, there is a need for an improved display of three-dimensional movies.

SUMMARY

The above stated problem is solved by the features of the independent claims. It is understood, that independent claims of a claim category may be formed in analogy to the dependent claims of another claim category.

Accordingly, it is provided:

A method for modifying pairs of images for improved three-dimensional displaying, the method comprising analyzing the images for detecting the angle of incidence of the illuminating light in the images, and modifying the luminance values of at least a section of at least one of the images of each pair based on the angle of incidence and anatomical details of the human face.

Further, it is provided:

An apparatus for modifying pairs of images for improved three-dimensional displaying, the apparatus comprising an image analyzer configured to analyze the images and detecting the angle of incidence of the illuminating light in the images, and an image processor configured to modify the luminance values of at least a section of at least one of the images of each pair based on the angle of incidence and anatomical details of the human face.

The pairs of images are understood to comprise two images of the same scene being provided each for one eye of the spectator to give the illusion of a three dimensional visual.

The present disclosure is based on the finding that three-dimensional visuals are usually recorded by a stereoscopic camera. However, the present disclosure in addition acknowledges that a camera does not consider the anatomy of the human face and that the pairs of images will usually be provided to the user's eyes from the front. This is also true for, e.g., computer-generated images in a computer game.

Human eyes are more sensitive to the luminance of a view rather than, e.g., the color information. Luminance information in an image is therefore the most important part of information of an image.

Further, for the human eyes since the human face has a nose, the eyes each receive different luminance values, e.g., because the nose casts a shadow for one eye but not for the other eye. Further, if for example the light in a real-life scene originates at the right, the right pupil will narrow and the left pupil will widen compared to the right eye. Therefore, the right eye will receive a darker image and the left eye will receive a brighter image. If in contrast the light in a real-life scene originates at the left, the left pupil will narrow and the right pupil will widen compared to the left eye. Therefore, the left eye will receive a darker image and the right eye will receive a brighter image.

The human brain constructs the final 3D image from the two single images recorded with both eyes. Further, the human brain is used to receive two different images with different luminance distributions. This is however not the case for stereoscopic cameras, which receive the same luminance from a scene for both images.

The present disclosure therefore provides the method for modifying pairs of images for improved three-dimensional displaying. The method especially considers the anatomical details of the human face and modifies the luminance of at least one of the images of each pair of images in at least a section of the respective image based on the anatomical details of the human face.

The terms "anatomical details of the human face" may refer to any anatomical detail in the human face that modifies the luminance of a visual received by the human eyes, e.g., the human nose and/or the eyeholes. The disclosure therefore tries to simulate the lighting conditions as they are present with a real human face.

If for example the light originates from the left of the user's face, the nose will in real life cast a shadow on the right eye's image and vice versa. Therefore, to correctly modify the luminance values in the respective sections of the images, the method comprises determining the angle of incidence of the illuminating light in the images.

With the resulting angle it may then be decided how the luminance values need to be modified and the luminance values may be modified based on the angle of incidence and anatomical details of the human face.

As already indicated above, not necessarily both images of each pair need to be modified and not the complete image needs to be modified in each case.

The resulting pair of images when presented to a user's eyes will more realistically resemble a real-life scene than any untreated pairs of images. Especially with moving images, like in movies or games, the adversary effect on the user will therefore be minimized.

Further embodiments of the present disclosure are subject of the further subclaims and of the following description, referring to the drawings.

In an embodiment, analyzing may comprise analyzing one image of each pair of images and determining the angle of incidence based on the luminance distribution and/or luminance histogram for the respective image.

The lighting situation of an object in an image is determined by the light reflected from the object while the image is recorded. Therefore, by determining the luminance distribution and/or histogram it may be determined how the single objects reflect the light and therefore, where the light originates at.

Since the lighting situation is the same situation for both images of each pair of images, it is sufficient to analyze only one image, i.e., either the left or the right image, of each pair of images to determine the angel of incidence.

In a further embodiment, the method may comprise determining a main light source in the respective image, wherein the angle of incidence is determined for the light of the main light source.

Using only the angle of incidence of the light from the main light source is sufficient to improve the quality of the pairs of images with regard to three-dimensional reproduction, since the main light source will define the overall lighting situation in the images.

Nevertheless, it is understood, that in another embodiment different sections of the images may be modified according to different angles of incident light, if multiple light sources are detected in an image.

Determining the main light source may, e.g., be performed by determining all or multiple angles of incidence for different light sources in the image and selecting the light source that is dominant, i.e., which angle is dominant among all determined angles. This may, e.g., be performed by determining the angles of incidence for all extracted objects (see below).

In another embodiment, determining the angle of incidence may comprise extracting objects in the respective image and determining the luminance distribution in the extracted objects.

Extracting objects may, e.g., comprise detecting edges in the image and extracting the objects based on the detected edges. It is however understood, that any other adequate method for detecting the objects in the respective image may also be used.

As explained above, each object in a scene is lighted from a specific direction and reflects the light accordingly. Therefore, an object that is lighted from the right will have higher brightness values on the right side than on the left. In contrast, an object lighted from the left will have higher brightness values on the left than on the right. If an object is lighted from the front or the back, the brightness of the object will be about evenly distributed over the surface of the object. If an object is lighted from the right side next to the user's head or the camera, the brightness of the object will, e.g., raise from left to right. If an object is lighted from the left side next to the user's head or the camera, the brightness of the object will, e.g., raise from right to left.

By analyzing the distribution of the brightness, e.g., where on the object the maximum brightness gradient is present, the angle of the incident light may be approximated. For example, the angle of incidence may be provided as four angles like 0°, 30°, 60° and 90° to each side of the image center, 0° referring to a light source on a side of the object and 90° referring to a light source directly in front or on the back of the object.

It is understood, that more or less angles are possible, for example all angles between 0° and 360° may be possible.

In an embodiment, determining the angle of incidence may comprise determining the luminance distribution in the respective image for the surrounding spaces of the extracted objects.

If for example the luminance distribution on the surface of a detected object is about uniformly distributed, it may be assumed that the incident light originates from the front or the back of the object. If the incident light originates from the front, the shadows cast by the object will be cast according to the geometrical arrangement to the back of the object, i.e., into the plane of the image. In contrast, if the incident light originates from the back of the object, the shadows cast by the object will be cast according to the geometrical arrangement to the front of the object, i.e., towards the user or out of the plane of the image.

For example, the incident light may be assumed to originate on the left behind the object, if the shadow is cast right of the object and at least a little bit below the object. The incident light may be assumed to originate on the right behind the object, if the shadow is cast left of the object and at least a little bit below the object.

It may therefore be identified if the light source is placed in front of the object or behind the object.

In another embodiment, modifying the luminance values may comprise only modifying the luminance values if the angle of incidence indicates a position of a light source of the incident light that is left or right of the image center.

If the light source is centered in the back of objects in the images or in the front of objects in the images (independent of the height of the light) in a real-life situation both eyes will receive about the same luminance distribution for the respective scene. Such an angle would be about 90°. Therefore, none of the images needs to be modified if the light source is neither placed to the right nor to the left of the image center.

If, however, the light source in a real-life scenario is left or right of the image center, the two eyes will receive different luminance values and distributions for the scene. Therefore, if the angel of incidence indicates such a position for the light source, the luminance of at least one of the images is modified accordingly.

If the light source is determined to be on the right behind the objects, i.e., behind the objects and the camera or the spectator's head, the image for the left eye may be at least partially darkened. In this case, the reflected light travels from right to left and arrives at the user's face from the right, i.e., the nose casts a shadow on the left eye.

If the light source is determined to be on the left behind the objects, i.e., behind the objects and the camera or the spectator's head, the image for the right eye may be at least partially darkened. In this case, the reflected light travels from left to right and arrives at the user's face from the left, i.e., the nose casts a shadow on the right eye. If the light source is determined to be on the right in front of the objects, i.e., between the objects and the camera or the spectator, the image for the right eye may be at least partially darkened. For this case, it is assumed that the light source is positioned at the right side but between the spectator and the objects. In this case, spectator's eye pupils react. The light coming from the original light source, e.g., the sun, causes the right eye to get a darker image since the right pupil reacts more to the light than the left pupil. In this case the reason for getting a darker image at the right eye may be the original light source not the reflected light.

If the light source is determined to be on the left in front of the objects, i.e., between the objects and the camera or the spectator, the image for the left eye may be at least partially darkened. The above explanation applies accordingly for the left eye.

In a further embodiment, modifying the luminance values may comprise darkening the left image under a line that divides the image starting from the right top corner of the image, the angle of the line being defined by the angle of incidence, or darkening the right image under a line that divides the image starting from the left top corner of the image, the angle of the line being defined by the angle of incidence.

Since the nose casts the shadow on either side of the user's face depending on the angle of incidence, the size of the shadow depends on the angle of incidence. Therefore, the shadow will be the largest, when the light source is left or right of the nose, i.e., when the light illuminates the objects from the right or from the left, and the shadow will be smallest, when the light illuminates the objects directly from the front or the back.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION

For sake of clarity in the following description of the method-based FIG. 1 the reference signs used above in the description of FIGS. 3-5 will be maintained.

Figure 1:
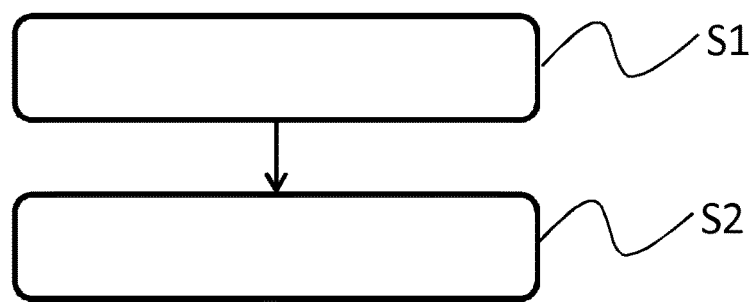
FIG. 1 shows a flow diagram of an embodiment of a method according to the present disclosure.

FIG. 1 shows a flow diagram of a method for modifying pairs of images 101 for improved three-dimensional displaying.

The method comprises analyzing S1 the images 523, 524 for detecting the angle of incidence of the illuminating light 211, 311, 525, 526, 527, 528 in the images 523, 524, and modifying S2 the luminance values of at least a section of at least one of the images 523, 524 of each pair based on the angle of incidence and anatomical details of the human face.

The step of analyzing S1 may, e.g., comprise analyzing one image 523, 524 of each pair of images 523, 524 and determining the angle of incidence based on the luminance distribution and/or luminance histogram for the respective image 523, 524.

Further, the method may comprise determining a main light source in the respective image 523, 524, wherein the angle of incidence is determined for the light 211, 311, 525, 526, 527, 528 of the main light source. Determining the angle of incidence may comprise extracting objects in the respective image 523, 524 and determining the luminance distribution in the extracted objects. In addition, determining the angle of incidence may comprise determining the luminance distribution in the respective image 523, 524 for the surrounding spaces of the extracted objects.

Modifying S2 the luminance values may comprise only modifying the luminance values if the angle of incidence indicates a position of a light source of the incident light 211, 311, 525, 526, 527, 528 that is left or right of the image center. Further, Modifying S2 the luminance values may comprise darkening the left image 523 under a line that divides the image 523 starting from the right top corner of the image 523, the angle of the line being defined by the angle of incidence, or darkening the right image 524 under a line that divides the image 524 starting from the left top corner of the image 524, the angle of the line being defined by the angle of incidence.

Figure 2:
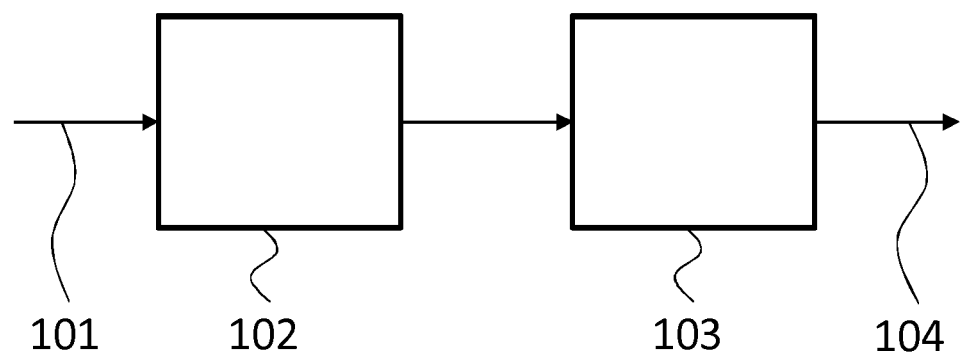
FIG. 2 shows a block diagram of an embodiment of an apparatus according to the present disclosure.
Figure 2:
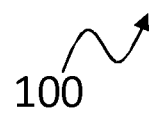

FIG. 2 shows a block diagram of an apparatus 100. The apparatus 100 comprises an image analyzer 102 that receives the pairs of images 101 and is coupled to an image processor 103.

The image analyzer 102 analyzes the images and detects the angle of incidence of the illuminating light in the images. This information is then provided together with the images 101 to the image processor 103. The image processor 103 modifies the luminance values of at least a section of at least one of the images of each pair based on the angle of incidence and anatomical details of the human face and outputs the modified image(s).

The image analyzer 102 may, e.g., analyze a single image of each pair of images and determine the angle of incidence based on the luminance distribution and/or luminance histogram for the respective image. Further, the image analyzer 102 may determine a main light source in the respective image and may determine the angle of incidence for the light of the determined main light source. The image analyzer 102 may extract objects in the respective image and determine the luminance distribution in the extracted objects to determine the angle of incidence. The image analyzer 102 may also determine the luminance distribution in the respective image for the surrounding spaces of the extracted objects to determine the angle of incidence.

The image processor 103 may, e.g., only modify the luminance values if the angle of incidence indicates a position of a light source of the incident light that is left or right of the image center.

The image processor 103 may darken the left image under a line that divides the image starting from the right top corner of the image, the angle of the line being defined by the angle of incidence, or darken the right image under a line that divides the image starting from the left top corner of the image, the angle of the line being defined by the angle of incidence.

Figure 3:
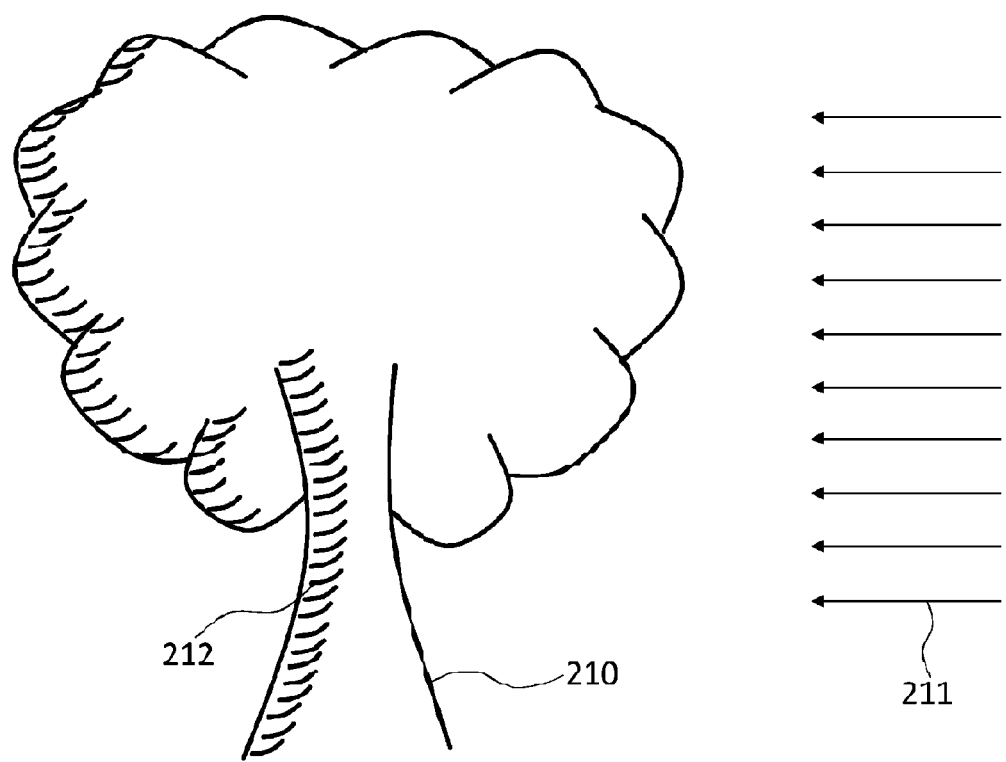
FIG. 3 shows an image with a scene for use with the present disclosure.

FIG. 3 shows an image with a scene showing a tree 210 with incident light 211 from the right. It can be seen, that darker areas or a shadow 212 is formed in the left sections of the tree 210 that are not directly illuminated by light 211.

In FIG. 3 it can be seen how the angle of incidence of the light 211 may be determined based on detecting single objects in the scene. For example, the tree 210 may be extracted with adequate algorithms from the scene and then the luminance distribution in the extracted tree 210 may be analyzed.

In the case of tree 210, it would be determined that the dark sections of the tree 210 are on the left of the tree and that therefore, the source of the light 211 must be on the right side of the tree.

It is understood, that the extent of the shadow 212 may be used as a measure regarding the angle. The larger the shadow 212 is, the more to the back of the tree the light source of light 211 must be positioned. If the shadow 212 for example covers about half the tree, the source of the light 211 may be assumed to be in an angle of 0° to the tree 210. If no shadow would be visible on the tree 210, the source of the light 211 might be assumed to be positioned in an angle of 90° to the tree 210.

Figure 4:
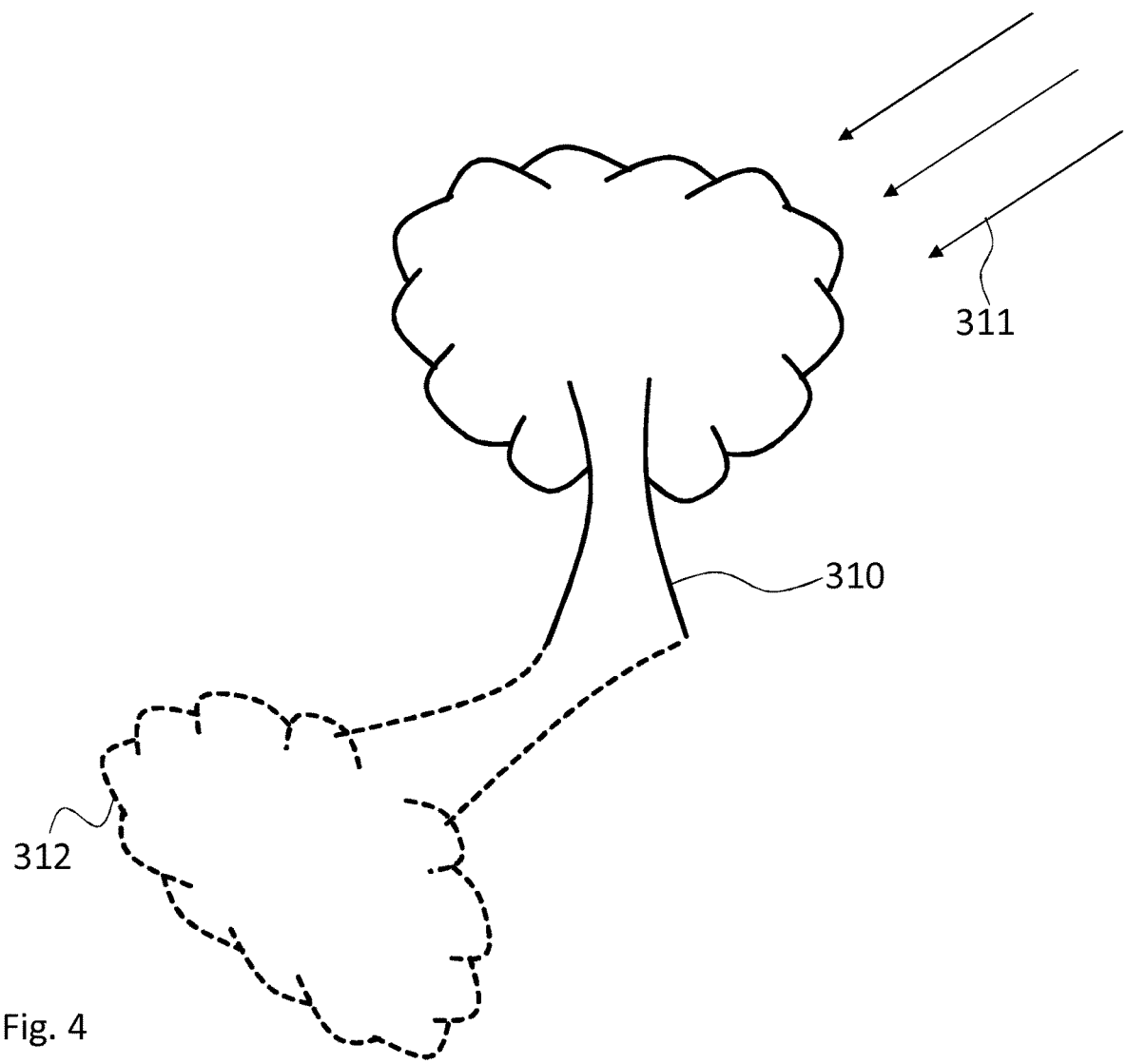
FIG. 4 shows another image with a scene for use with the present disclosure.

FIG. 4 shows another image with a scene showing a tree 310. FIG. 4 serves for explaining how the surroundings of the detected objects may also serve to determine where the source of the incident light 311 is positioned. In FIG. 4 the shadow does not refer to a shadow on the tree 310 but to the shadow that is cast by the tree 310.

If an object is detected, in this case tree 310, the surroundings of the object in the scene or image may be analyzed to detect a shadow 312 cast by the respective object. The position and size of the shadow 312 may then be used to determine the position of the source of light 311. It is especially possible to determine if the light source is parallel to the object or in front or behind the object.

If the shadow 312 is oriented from the tree 310 or respective object to the lower edge of the scene or image, the source of the light 311 may be assumed to be behind the tree 310 or the respective object. If the shadow 312 is oriented from the tree 310 or respective object to the upper edge of the scene or image, the source of the light 311 may be assumed to be in front of the tree 310 or the respective object. If the shadow 312 is oriented from the tree 310 or respective object to the side, the source of the light 311 may be assumed to be in a line with the tree 310 or the respective object.

Figure 5:
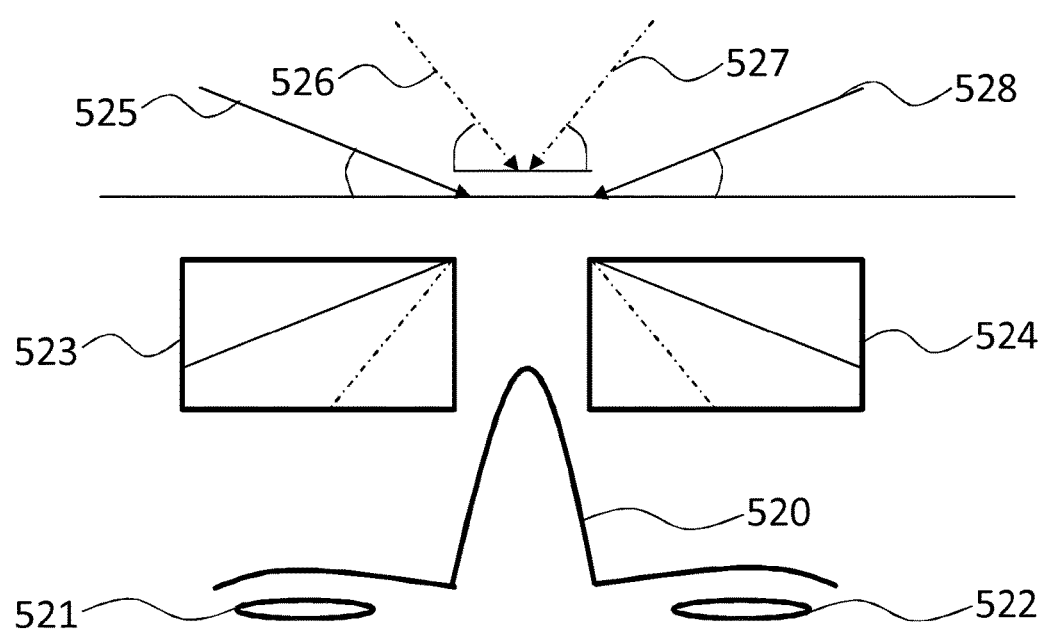
FIG. 5 shows a section of a human face for use with the present disclosure.

FIG. 5 shows a section of a human face with a nose 520 sitting between a left eye 521 and a right eye 522. In front of each eye 521, 522 a corresponding image is shown. Further, incident light 525, 526, 527, 528 is shown. Incident light 525 originates at the left and compared to the image plane or the plane of the user's eyes has a rather small angle, incident light 525 also originates at the left and comprises a larger angle. Incident light 527 originates at the right and comprises the same angle as incident light 527 but from the other direction. Incident light 528 originates at the right and comprises the same angle as incident light 525 but from the other direction.

It can be seen how in the images 523, 524, the sections of the images 523, 524 that are affected by the shadow of the nose 520 change according to the angle of incidence of the incident light 525, 526, 527, 528.

It is understood, that the start of the line that defines the section that is to be darkened may also be provided on any point of the right edge in the left image 523 or the left edge in the right image 524, or on the top edge.

The start of the line may, e.g., depend on the size of the nose. The method may therefore, e.g., provide a number of standard models that may be chosen by the user. For example, such standard models may refer to a small nose, a medium nose and a large nose.

Exemplarily, with the small nose chosen, the start of the line may be low on the right edge or the left edge, as indicated above. With the medium nose chosen, the start of the line may be in the upper half of the respective edges of the images 523, 524. With the large nose chosen, the start of the line may be in the respective upper corner of the image.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present disclosure provides a method for modifying pairs of images 101 for improved three-dimensional displaying, the method comprising analyzing the images 523, 524 for detecting the angle of incidence of the illuminating light 211, 311, 525, 526, 527, 528 in the images 523, 524) and modifying the luminance values of at least a section of at least one of the images 523, 524 of each pair based on the angle of incidence and anatomical details of the human face. Further, the present disclosure provides a respective apparatus 100.

LIST OF REFERENCE SIGNS 100 apparatus
101 pairs of images
102 image analyzer
103 image processor
104 modified image
210, 310 tree
211, 311 incident light
212, 312 shadow
520 nose
521 left eye
522 right eye
523 left image
524 right image
525, 526, 527, 528 incident light
S1, S2 method steps

The invention claimed is:

1. A method for modifying pairs of images for improved three-dimensional displaying, the method comprising:
analyzing the images for detecting an angle of incidence of illuminating light in the images; and
modifying luminance values of at least a section of at least one of the images of each pair based on the angle of incidence and anatomical details of a human face, wherein the anatomical details of the human face refer to a human nose;
wherein the analyzing comprises analyzing one image of each pair of images and determining the angle of incidence based on luminance distribution and/or luminance histogram for the respective image, and wherein the determining the angle of incidence comprises extracting objects in the respective image and determining the luminance distribution in the extracted objects.

2. The method according to claim 1, comprising determining a main light source in the respective image, wherein the angle of incidence is determined for the light of the main light source.

3. The method according to claim 1, wherein the determining the angle of incidence comprises determining the luminance distribution in the respective image for surrounding spaces of the extracted objects.

4. The method according to claim 1, wherein modifying the luminance values comprises only modifying the luminance values if the angle of incidence indicates a position of a light source of the incident light that is left or right of an image center.

5. The method according to claim 1, wherein modifying the luminance values comprises darkening a left image under a line that divides the left image starting from a right top corner of the left image, an angle of the line being defined by the angle of incidence, or darkening a right image under a line that divides the right image starting from a left top corner of the right image, an angle of the line that divides the right image being defined by the angle of incidence.

6. A method for modifying pairs of images for improved three-dimensional displaying, the method comprising:
    analyzing the images for detecting an angle of incidence of illuminating light in the images; and
    modifying luminance values of at least a section of at least one of the images of each pair based on the angle of incidence and anatomical details of a human face;
    wherein the analyzing comprises analyzing one image of each pair of images and determining the angle of incidence based on luminance distribution and/or luminance histogram for the respective image, and the determining the angle of incidence comprises extracting objects in the respective image and determining the luminance distribution in the extracted objects.

7. A method for modifying pairs of images for improved three-dimensional displaying, the method comprising:
    analyzing the images for detecting an angle of incidence of illuminating light in the images; and
    modifying luminance values of at least a section of at least one of the images of each pair based on the angle of incidence and anatomical details of a human face, wherein the modifying the luminance values comprises darkening a left image under a line that divides the left image starting from a right top corner of the left image, an angle of the line being defined by the angle of incidence, or darkening a right image under a line that divides the right image starting from a left top corner of the right image, an angle of the line that divides the right image being defined by the angle of incidence.

8. A method for modifying pairs of images for improved three-dimensional displaying, the method comprising:
    analyzing the images for detecting an angle of incidence of illuminating light in the images; and
    modifying luminance values of at least a section of at least one of the images of each pair based on the angle of incidence and anatomical details of a human face, wherein the anatomical details of the human face refer to a human nose;
    wherein the modifying the luminance values comprises darkening a left image under a line that divides the left image starting from a right top corner of the left image, an angle of the line being defined by the angle of incidence, or darkening a right image under a line that divides the right image starting from a left top corner of the right image, an angle of the line that divides the right image being defined by the angle of incidence.

* * * * *